United States Patent [19]

Hardesty et al.

[11] Patent Number: 4,660,360
[45] Date of Patent: Apr. 28, 1987

[54] FLEXIBLE CUTTERBAR ASSEMBLY

[75] Inventors: Richard A. Hardesty, Hinsdale; Dathan R. Kerber, Bollingbrook; Orlin W. Johnson, Lockport; Richard E. Benson, East Moline, all of Ill.

[73] Assignee: J. I. Case Company, Racine, Wis.

[21] Appl. No.: 788,047

[22] Filed: Oct. 15, 1985

[51] Int. Cl.⁴ ............................................. A01D 67/00
[52] U.S. Cl. ...................................... 56/208; 56/15.8; 56/303; 56/307
[58] Field of Search ...................... 56/10.4, 14.5, 14.6, 56/15.8, DIG. 10, 303, 208, 307, 364, 181

[56] References Cited

U.S. PATENT DOCUMENTS

| | | | |
|---|---|---|---|
| 3,982,383 | 9/1976 | Mott | 56/208 |
| 4,011,709 | 3/1977 | Mott et al. | 56/10.4 |
| 4,023,333 | 5/1977 | Anderson | 56/208 |
| 4,199,925 | 4/1980 | Quick et al. | 56/208 |
| 4,599,852 | 7/1986 | Kerber et al. | 56/208 |

FOREIGN PATENT DOCUMENTS 2121680  11/1972  Fed. Rep. of Germany ........ 56/208

Primary Examiner—Gene Mancene
Assistant Examiner—John G. Weiss
Attorney, Agent, or Firm—Dressler, Goldsmith, Shore, Sutker & Milnamow, Ltd.

[57] ABSTRACT

A cutterbar assembly for the header of an agricultural combine having a skid coextensive with the cutterbar but comprising individual skid segments. The knife guard likewise comprises individual segments positioned in aligned relationship with the skid segments, whereby the flexibility of the cutterbar is enhanced so that it is able to follow the contour of the ground without row sensitivity. The skid segments are corrugated to provide a more efficient strength to weight ratio.

3 Claims, 3 Drawing Figures

FLEXIBLE CUTTERBAR ASSEMBLY

TECHNICAL FIELD

This invention relates to crop harvesting implements such as combines and, more particularly, to improvements in the cutterbar assembly of agricultural combines.

BACKGROUND OF THE INVENTION

The various working sections of an agricultural combine may be said to comprise three sections: a forwardly positioned header section which carries a cutterbar and knife for harvesting the crop, a platform for raking the crop toward the cutterbar and knife, and an auger associated with the platform for combining and feeding the harvested crop on the platform rearwardly; an intermediate feeder section for conveying the crop rearwardly from the header to a threshing section; and a thresher in the thresher section for separating the main edible crop from the remaining plant parts. For efficient harvesting of low growing crops, it is, of course, desirable to have the cutterbar and knife follow as close as possible to the contour of the ground without jamming or digging into the soil.

In general, the header section of a combine may be considered to be a comparatively rigid structure. However, the cutterbar and knife carried by the header are characterized by a limited flexibility related to the materials of construction and the size of the combine and transverse width of the header.

It is well known to provide a combine header with bottom shoes or skids which ride on the ground and support the knife thereabove for performance of its cutting operation. An example of such structure may be seen in U.S. Pat. No. 1,881,411 which discloses individual shoes spaced along the width of the cutter frame. A drawback to the individual shoe arrangement taught by the patent was that the cutter was undesirably row sensitive. For example, if one of the shoes was riding in a groove or depression between crop rows, the limited flexibility of the cutter frame might cause the cutter to tilt upwardly.

More recently, cutterbar assemblies have been provided with a continuous skid which spans substantially the full width of the header. While those arrangements eliminated the problems of row sensitivity, they reduced the flexibility of the cutterbar thereby interfering with the cutterbar's ability to follow the contour of the ground. In addition, the continuous skids added appreciably to the weight of the cutterbar assembly.

There thus exists a need for a cutterbar assembly which retains it desirable characteristics of flexibility but is nonetheless not row sensitive. Similarly, there exists a need for a flexible cutterbar assembly which is efficient and durable but nonetheless reduces the overall weight of the cutterbar.

SUMMARY OF THE INVENTION

The present invention provides a cutterbar assembly for agricultural combines which is desirably flexible and able to undulate and track the contours of the ground and yet is not row sensitive. The cutter bar assembly includes a skid which spans the entire width of the header but is nonetheless reduced substantially in weight from assemblies employing similar skids.

In general, the cutterbar assembly of the invention comprises a plurality of skid segments secured to the cutterbar across the width thereof. When operationally mounted, the individual segments cooperate to provide a unified, but multisegmented skid which does not rigidify or impair the inherent flexibility of the cutterbar.

Harvesting cutters of the type under consideration invariably include a cutter guard associated with the knife for protecting the knife and providing a stationary form against which the reciprocating knife does its work. The present invention comprises a plurality of individual knife guards which, when operationally connected to the cutterbar, provide a multisegmented knife guard. The knife guard segments are mounted in registry with the skid segments so that the flexibility of the cutterbar is in no way impaired.

Additionally, the invention comprises skid segments which are corrugated to provide a high strength to weight ratio. As a result, lighter gauge materials are employed to reduce the overall weight of the cutterbar assembly.

Numerous other advantages and features of the present invention will become readily apparent from the following detailed description of the invention, from the claims, and from the accompanying drawings.

BRIEF DESCRIPTION OF THE DRAWINGS

In the accompanying drawings forming a part of the specification, and in which like numerals are employed to designate like parts throughout the same.

DETAILED DESCRIPTION OF THE INVENTION

Figure 1:
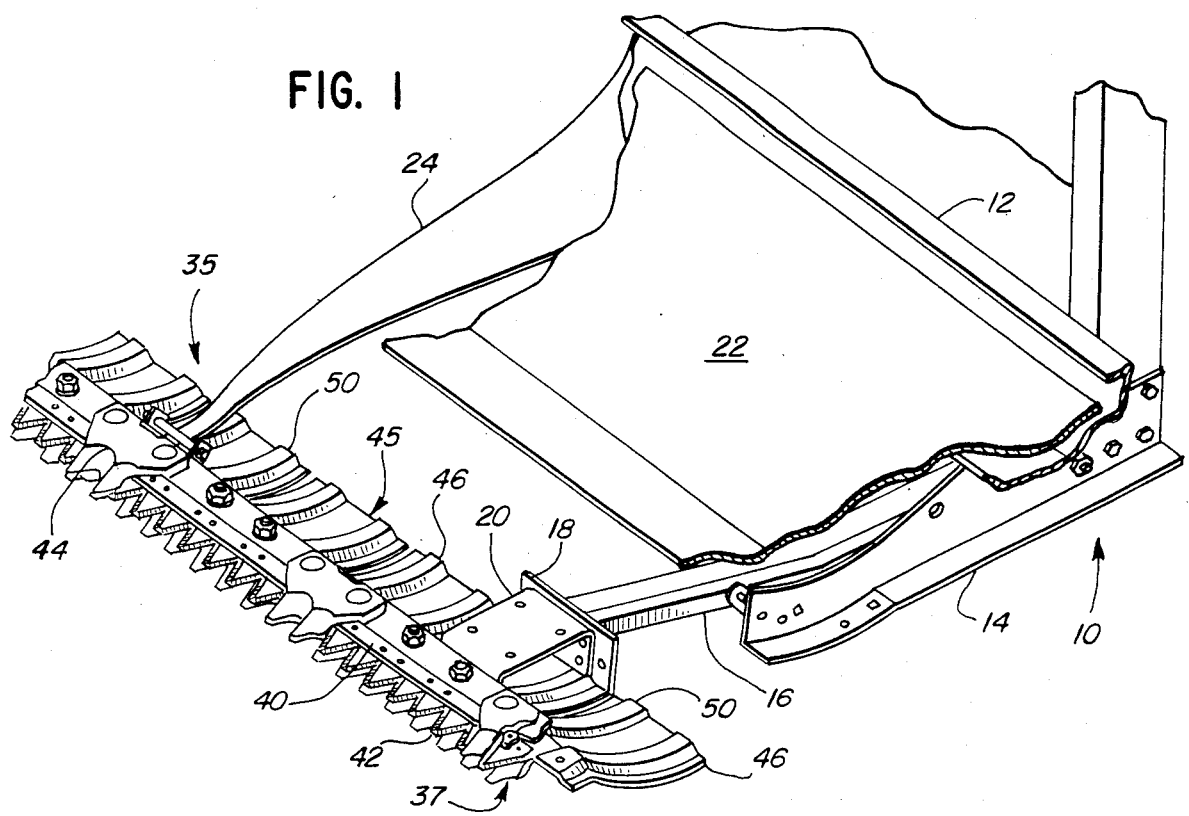
FIG. 1 is a fragmentary perspective view of a portion of a combine header and cutterbar assembly embodying the principles of the invention.

Referring with greater particularity to the various figures of the drawings, it will be seen that the reference number 10 indicates generally a header frame (shown only fragmentarily) with which the present invention is adapted to be incorporated. Since the header frame per se does not comprise an essential part of the invention, only so much thereof as is necessary to provide an environment for and understanding of the present invention will be described.

Header frame 10 comprises a main transverse beam 12 having a plurality of longitudinal support beams 14 rigidly connected thereto. A second support beam such as 16 is pivotally connected to each of the beams 14, and said support beam 16 carries connector means such as a vertical plate 18 and horizontal plate 20 for operationally supporting a cutterbar assembly 35 which is the subject matter of the present invention. Header frame 10 also comprises a trough-like platform 22 for receiving the harvested crops and a plurality of resilient suspension means such as the leaf spring 24 adapted to provide a counterbalancing support for the cutterbar assembly 35. It will be appreciated that the support beams 14 and suspension springs 24 typically will be spaced along the full length of the cutterbar assembly 35, the exact number of such members depending upon the actual size of the header frame and cutterbar assembly.

Figure 2:
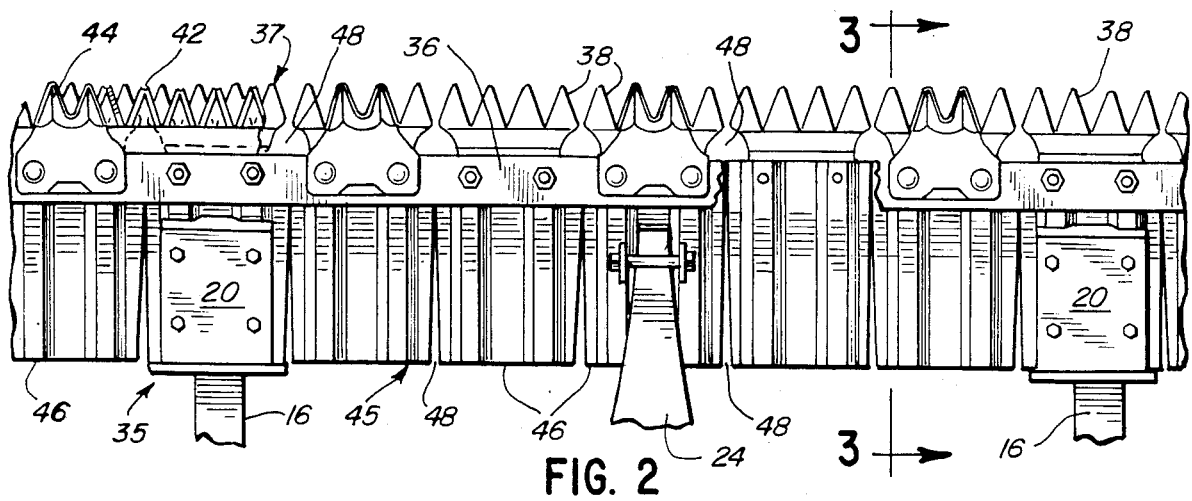
FIG. 2 is a fragmentary top plan view of the cutterbar assembly with portions broken away for clarity of illustration.
Figure 3:
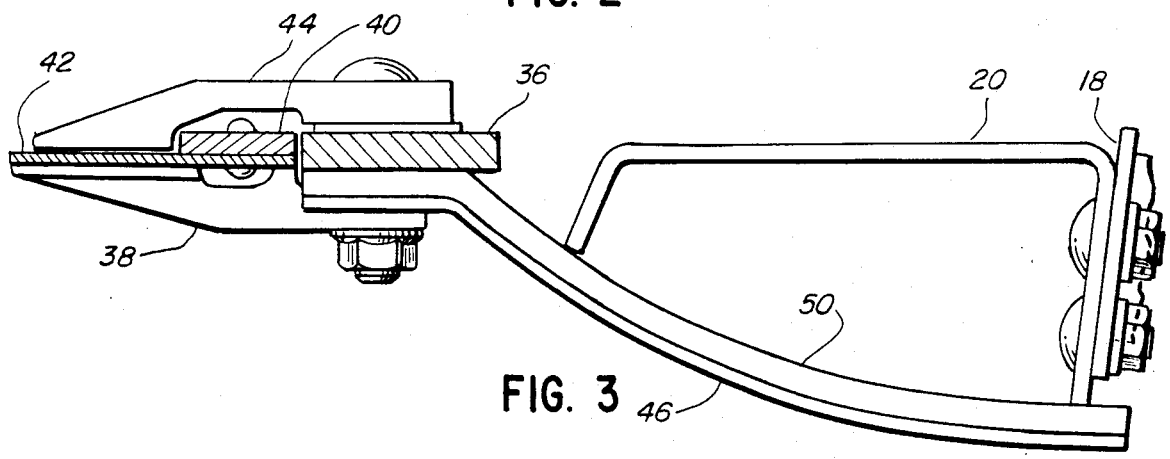
FIG. 3 is an enlarged sectional view on the plane of line 3—3 of FIG. 2.

Cutterbar assembly 35 comprises a stationary cutterbar 36 which functions as a unifying spine to which other assembly members are connected. A stationary knife guard 37 is secured to the bottom surface of the cutterbar 36, and it will be noted that said knife guard comprises a plurality of individual knife guard segments 38 (see FIG. 2). A reciprocating knife drive bar 40 carrying a scythe or knife 42 is supported above the knife guard 37 and said drive bar is conventionally connected to a wobble-type drive (not shown). Stationary hold-down clips 44 are secured to the top surface of the cutterbar 36 spaced along the length thereof.

Likewise secured to the cutterbar 36 is a skid 45, and it will be noted that said skid comprises a plurality of individual skid segments 46. It is also important to note that the skid segments 46 are of substantially the same maximum width as the knife guard segments 38, and that skid segments and knife guard segments are secured to the cutterbar in alignment or registry with each other. Accordingly, there is provided along the length of the cutterbar 36 a plurality of breaks or discontinuities 48 between each associated skid and knife segment.

As seen in the various figures of the drawings, the skid segments 46 are formed with longitudinal corrugations 50, such corrugated skids affording greatly enhanced strength to weight ratio and thereby permitting the use of lighter than normal gauge metals for the skids.

The connector plates 20 may be secured to appropriately spaced skid segments 46 by any suitable means such as welding, and the leaf springs 24 may comprise a slidable connection to appropriately spaced skid segments as illustrated.

With the segmented skid and knife guard construction shown and described, the cutterbar 36 is provided with enhanced flexibility at each of the breaks 48 between those segments. As a result, the cutterbar assembly of the inventon is free to undulate and closely follow uneven and changing ground surfaces and thereby avoid row sensitivity.

It will be readily observed from the foregoing detailed description of the invention and illustrative embodiment thereof that numerous variations and modifications may be effected by those skilled in the art without departing from the true spirit and scope of the novel concept of the principles of the invention.

What is claimed is:

1. A cutterbar assembly for the header of an agricultural combine or the like comprising:
   an elongated cutterbar;
   an elongated knife reciprocably associated with said cutterbar and substantially coextensive therewith;
   a plurality of individual knife guard segments secured to said cutterbar in side-by-side relationship forming a segmented knife guard substantially coextensive with said cutterbar; and
   a plurality of individual skid segments secured to said cutterbar in side-by-side relationship forming a segmented skid substantially coextensive with said cutterbar,
   said knife guard segments and skid segments being of substantially the same width and being secured to said cutterbar so that the breaks between the skid segments are aligned with the breaks between knife guard segments whereby said cutterbar is adapted to flex at said aligned breaks.

2. The cutterbar assembly of claim 1 wherein said skid segments comprise corrugations extending from front to rear thereof.

3. A cutterbar assembly attachable to the header of an agricultural combine or the like comprising:
   a cutterbar;
   a knife reciprocably associated with said cutterbar;
   a knife guard projecting forwardly from said cutterbar and beneath said knife, which comprises a plurality of individual knife guard segments secured to said cutterbar in side-by-side relationship; and
   a skid secured to said cutterbar and substantially coextensive therewith, said skid comprising a plurality of individual skid segments secured to said cutterbar in side-by-side relationship and extending rearwardly therefrom, whereby said knife guard segments and skid segments comprise aligned pairs.

* * * * *